(12) United States Patent
Inoue

(10) Patent No.: US 11,168,838 B2
(45) Date of Patent: Nov. 9, 2021

(54) METHOD AND APPARATUS FOR PRODUCING HIGH-PRESSURE TANK

(71) Applicant: TOYOTA JIDOSHA KABUSHIKI KAISHA, Toyota (JP)

(72) Inventor: Kyojiro Inoue, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/115,985

(22) Filed: Dec. 9, 2020

(65) Prior Publication Data
US 2021/0215293 A1 Jul. 15, 2021

(30) Foreign Application Priority Data

Jan. 9, 2020 (JP) .............................. JP2020-001818

(51) Int. Cl.
*F17C 1/06* (2006.01)
(52) U.S. Cl.
CPC ........ *F17C 1/06* (2013.01); *F17C 2201/0109* (2013.01); *F17C 2203/0609* (2013.01); *F17C 2209/2154* (2013.01)
(58) Field of Classification Search
CPC ................ F17C 1/06; F17C 2209/2154; F17C 2203/0609; F17C 2201/0109
See application file for complete search history.

(56) References Cited

U.S. PATENT DOCUMENTS

| 6,190,481 B1 * | 2/2001 | Iida ....................... B29C 70/382 |
| | | 156/175 |
| 2017/0291352 A1 | 10/2017 | Ueda et al. |
| 2019/0168989 A1 * | 6/2019 | Kobayashi ............. B65H 54/44 |

FOREIGN PATENT DOCUMENTS

JP 2017185742 A 10/2017

* cited by examiner

*Primary Examiner* — Vishal I Patel
(74) *Attorney, Agent, or Firm* — Dickinson Wright, PLLC

(57) ABSTRACT

A method for producing a high-pressure tank that can reduce the positional deviation of a wound fiber bundle. In the method for producing the high-pressure tank, the fiber bundle impregnated with an uncured thermosetting resin is wound around a liner for housing gas so as to form, on the liner, a reinforcing layer with a plurality of fiber-reinforced resin layers. The method for producing the high-pressure tank includes pressing an edge portion on at least one side along the longitudinal direction of the fiber bundle in the width direction of the fiber bundle to deform the edge portion so as to protrude in the thickness direction of the fiber bundle and thermally curing the thermosetting resin in the edge portion deformed so as to form a protruding portion in the edge portion, and forming the fiber-reinforced resin layers with the fiber bundle with the edge portion deformed.

8 Claims, 7 Drawing Sheets

METHOD AND APPARATUS FOR PRODUCING HIGH-PRESSURE TANK

CROSS REFERENCE TO RELATED APPLICATIONS

The present application claims priority from Japanese patent application JP 2020-001818 filed on Jan. 9, 2020, the entire content of which is hereby incorporated by reference into this application.

BACKGROUND

Technical Field

The present disclosure relates to a method and apparatus for producing a high-pressure tank, in which a fiber bundle impregnated with an uncured thermosetting resin, is wound around a liner for housing gas so as to form, on the liner, a reinforcing layer with a plurality of fiber-reinforced resin layers stacked.

Background Art

In general, in such products as pressure-resistant containers requiring mechanical properties such as pressure resistance and lightness, for example, a high-pressure tank for use in fuel cell vehicles, a reinforcing layer with a plurality of fiber-reinforced resin layers stacked is formed on the outer periphery surface of a liner having a space for housing gas or the like. For forming such fiber-reinforced resin layers, for example, filament winding is adopted using a fiber bundle impregnated with an uncured thermosetting resin.

As an example of the filament winding, JP 2017-185742 A discloses a method for producing a high-pressure tank, in which a fiber bundle impregnated with an uncured thermosetting resin is continuously wound around the outer periphery surface of a tank liner while the liner is being rotated in one direction, so that a plurality of fiber-reinforced resin layers are formed.

SUMMARY

However, in such a production method disclosed in JP 2017-185742 A, in continuously winding the fiber bundle impregnated with the thermosetting resin, since the thermosetting resin is uncured, the viscosity of the thermosetting resin is variable. Therefore, the gripping force (frictional force) of the wound fiber bundle becomes uneven due to the varying viscosity, which may cause a deviation of the fiber bundle from the position where it should be wound.

The present disclosure has been made in view of the foregoing, and provides a method and apparatus for producing a high-pressure tank that can reduce the positional deviation of the wound fiber bundle.

In view of the foregoing, the present disclosure provides a method for producing a high-pressure tank, in which a fiber bundle impregnated with an uncured thermosetting resin is wound around a liner for housing gas while the liner is being rotated so as to form, on the liner, a reinforcing layer with a plurality of fiber-reinforced resin layers stacked, the method including pressing an edge portion on at least one side along the longitudinal direction of the fiber bundle in the width direction of the fiber bundle to deform the edge portion so as to protrude in the thickness direction of the fiber bundle and thermally curing the thermosetting resin in the edge portion deformed so as to form a protruding portion in the edge portion, and forming the fiber-reinforced resin layers with the fiber bundle having the protruding portion formed thereon.

According to the present disclosure, by pressing an edge portion on at least one side along the longitudinal direction of a fiber bundle in the width direction of the fiber bundle, the edge portion is deformed so as to protrude in the thickness direction of the fiber bundle, and the thermosetting resin in the edge portion deformed is thermally cured, thus forming a protruding portion in the edge portion of the fiber bundle. It should be noted that "pressing the edge portion" herein encompasses pressing directly the edge portion of the fiber bundle and pressing the edge portion of the fiber bundle as a result of the edge portion being brought into contact with a fixed member.

In forming the fiber-reinforced resin layers, the fiber bundle is wound around the liner while the liner is being rotated. Through such forming, owing to the anchor effect of the protruding portion of the wound fiber bundle, slipping of the fiber bundle is reduced, thereby being capable of reducing the positional deviation of the wound fiber bundle. It should be noted that since the thermosetting resin with which the fiber bundle is impregnated is uncured on the inner side of the edge portion, the thermosetting resin of the fiber bundle is not entirely thermally cured, and therefore, the fiber bundle is likely to follow the liner and the surface of the fiber-reinforced resin layer as a lower layer.

Herein, the protruding portion may be formed on one side of the fiber bundle, but in some embodiments, the protruding portion is formed on each of the opposite sides of the fiber bundle. This may further exhibit the anchor effect of the protruding portion formed in the edge portion in winding the fiber bundle.

Herein, in stacking a plurality of fiber-reinforced resin layers, as long as the anchor effect of the protruding portion in the edge portion of the fiber bundle as an upper layer can be exhibited, the way of continuously winding the fiber bundle is not particularly limited to hoop winding or helical winding. However, in some embodiments, in forming the fiber-reinforced resin layers, the fiber-reinforced resin layer as an upper layer is further formed on the fiber-reinforced resin layer as a lower layer by winding the fiber bundle along the circumferential direction of the liner such that the protruding portion is disposed on a portion including the uncured thermosetting resin of the fiber-reinforced resin layer as the lower layer.

According to the aforementioned aspect, in forming a plurality of fiber-reinforced resin layers by winding the fiber bundle, the fiber-reinforced resin layer as an upper layer is formed on the fiber-reinforced resin layer as a lower layer. In forming the fiber-reinforced resin layer as the upper layer, the protruding portion is disposed on and enters a portion including the uncured thermosetting resin of the fiber-reinforced resin layer as the lower layer. This can reduce the positional deviation of the wound fiber bundle of the fiber-reinforced resin layer as the upper layer in forming the plurality of fiber-reinforced resin layers.

Herein, as long as the anchor effect of the protruding portion in the edge portion of the fiber bundle can be exhibited, the way of winding the fiber bundle of the fiber-reinforced resin layer forming each layer is not particularly limited to hoop winding or helical winding. However, in some embodiments, in forming the fiber-reinforced resin layers, each fiber-reinforced resin layer is formed by winding the fiber bundle such that the protruding portion sequentially overlaps, along the circumferential direction of the liner, the portion including the uncured thermosetting resin on the inner side of the edge portion of the fiber bundle wound around the liner.

According to the aforementioned aspect, a protruding portion with the cured thermosetting resin is formed in the deformed edge portion, and in winding the fiber bundle, the protruding portion overlaps and enters a portion including the uncured thermosetting resin on the inner side of the edge portion of the fiber bundle wound around the liner. This can reduce the positional deviation of the wound fiber bundle in forming each fiber-reinforced resin layer.

The present specification also discloses an apparatus for more suitably producing the aforementioned high-pressure tank. The present disclosure provides a producing apparatus for a high-pressure tank, in which a fiber bundle impregnated with an uncured thermosetting resin is wound around a liner for housing gas so as to form, on the liner, a reinforcing layer with a plurality of fiber-reinforced resin layers stacked, the producing apparatus including a rotating unit adapted to rotate the liner about the axial direction of the liner and a delivery unit adapted to deliver the fiber bundle impregnated with the uncured thermosetting resin to the periphery of the liner being rotated while reciprocating from one end to the other end of the liner along the axial direction, the delivery unit including a press heating part adapted to press an edge portion on at least one side along the longitudinal direction of the fiber bundle in the width direction of the fiber bundle to deform the edge portion so as to protrude in the thickness direction of the fiber bundle and to thermally cure, through heating, the thermosetting resin in the edge portion deformed.

According to the present disclosure, while the rotating unit rotates the liner, the delivery unit delivers a fiber bundle impregnated with an uncured thermosetting resin to the periphery of the liner being rotated while reciprocating from one end to the other end of the liner along the axial direction of the liner. In this manner, the fiber bundle impregnated with the uncured thermosetting resin is wound around the liner, so that a reinforcing layer with a plurality of fiber-reinforced resin layers stacked can be formed on the liner.

Herein, the delivery unit is provided with the press heating part, which presses the edge portion on at least one side along the longitudinal direction of the fiber bundle in the width direction of the fiber bundle before winding the fiber bundle around the liner. With such pressing, the edge portion is deformed so as to protrude in the thickness direction of the fiber bundle. The press heating part heats the deformed edge portion to thermally cure the thermosetting resin in the edge portion, thus forming a protruding portion in the edge portion of the fiber bundle. It should be noted that the thermosetting resin with which the fiber bundle is impregnated on the inner side of the edge portion is uncured. Since the thermosetting resin of the fiber bundle is not entirely thermally cured, the fiber bundle is likely to follow the liner and the surface of the fiber-reinforced resin layer as a lower layer.

Herein, the press heating part may deform the edge portion on one side along the longitudinal direction of the fiber bundle, but in in some embodiments, the press heating part presses the edge portion on each of the opposite sides along the longitudinal direction of the fiber bundle in the width direction of the fiber bundle to deform the edge portion so as to protrude in the thickness direction of the fiber bundle, and thermally cures, through heating, the thermosetting resin in the edge portion deformed. This may further exhibit the anchor effect since the protruding portion can be formed in the edge portion on each of the opposite sides of the fiber bundle in winding the fiber bundle.

Further, in stacking the plurality of fiber-reinforced resin layers, as long as the anchor effect of the protruding portion in the edge portion of the fiber bundle as an upper layer can be exhibited, the position where the fiber bundle delivered from the delivery unit is wound is not particularly limited. However, in some embodiments, the producing apparatus includes a control device adapted to control the position where the fiber bundle delivered from the delivery unit is wound, the control device controlling the position where the fiber bundle is wound such that the edge portion deformed of the fiber bundle is disposed on a portion including the uncured thermosetting resin of the fiber-reinforced resin layer as a lower layer.

According to this aspect, in forming the plurality of fiber-reinforced resin layers by winding the fiber bundle with the reciprocating movement of the delivery unit, the fiber-reinforced resin layer as an upper layer is formed on the fiber-reinforced resin layer as a lower layer. Herein, in forming the fiber-reinforced resin layer as the upper layer, the thermally cured protruding portion of the fiber bundle delivered from the delivery unit is disposed on a portion including the uncured thermosetting resin of the fiber-reinforced resin layer as the lower layer, and thus enters the portion. This can reduce the positional deviation of the wound fiber bundle of the fiber-reinforced resin layer as the upper layer in forming the plurality of fiber-reinforced resin layers.

Herein, the control device controls the position where the fiber bundle delivered from the delivery unit is wound or the like, so that the way of winding the fiber bundle may be determined to be hoop winding, helical winding, or the like. Further, in stacking the plurality of fiber-reinforced resin layers, as long as the anchor effect of the protruding portion in the edge portion of the fiber bundle as an upper layer can be exhibited, the delivery of the fiber bundle by the delivery unit is not particularly limited. However, in some embodiments, the producing apparatus includes the control device adapted to control the position where the fiber bundle delivered from the delivery unit is wound, the control device controlling the position where the fiber bundle is wound such that the edge portion deformed by the press heating part overlaps, along the circumferential direction of the liner, a portion including the uncured thermosetting resin on the inner side of the edge portion of the fiber bundle wound around the liner.

According to this aspect, the protruding portion (edge portion of the fiber bundle) with the thermosetting resin cured by the press heating part overlaps and enters a portion including the uncured thermosetting resin on the inner side of the edge portion of the fiber bundle wound around the liner, with the control of the position of the fiber bundle to be wound. As a result, in forming each fiber-reinforced resin layer, the positional deviation of the wound fiber bundle can be reduced.

According to the present disclosure, with the edge portion of the wound fiber bundle deformed so as to protrude, the thermosetting resin in the edge portion is thermally cured, so that a protruding portion can be formed in the edge portion. With the anchor effect of the protruding portion, the positional deviation of the fiber bundle can be prevented.

DETAILED DESCRIPTION

The following embodiments of the present disclosure will be described with reference to the drawings.

First Embodiment

Figure 1:
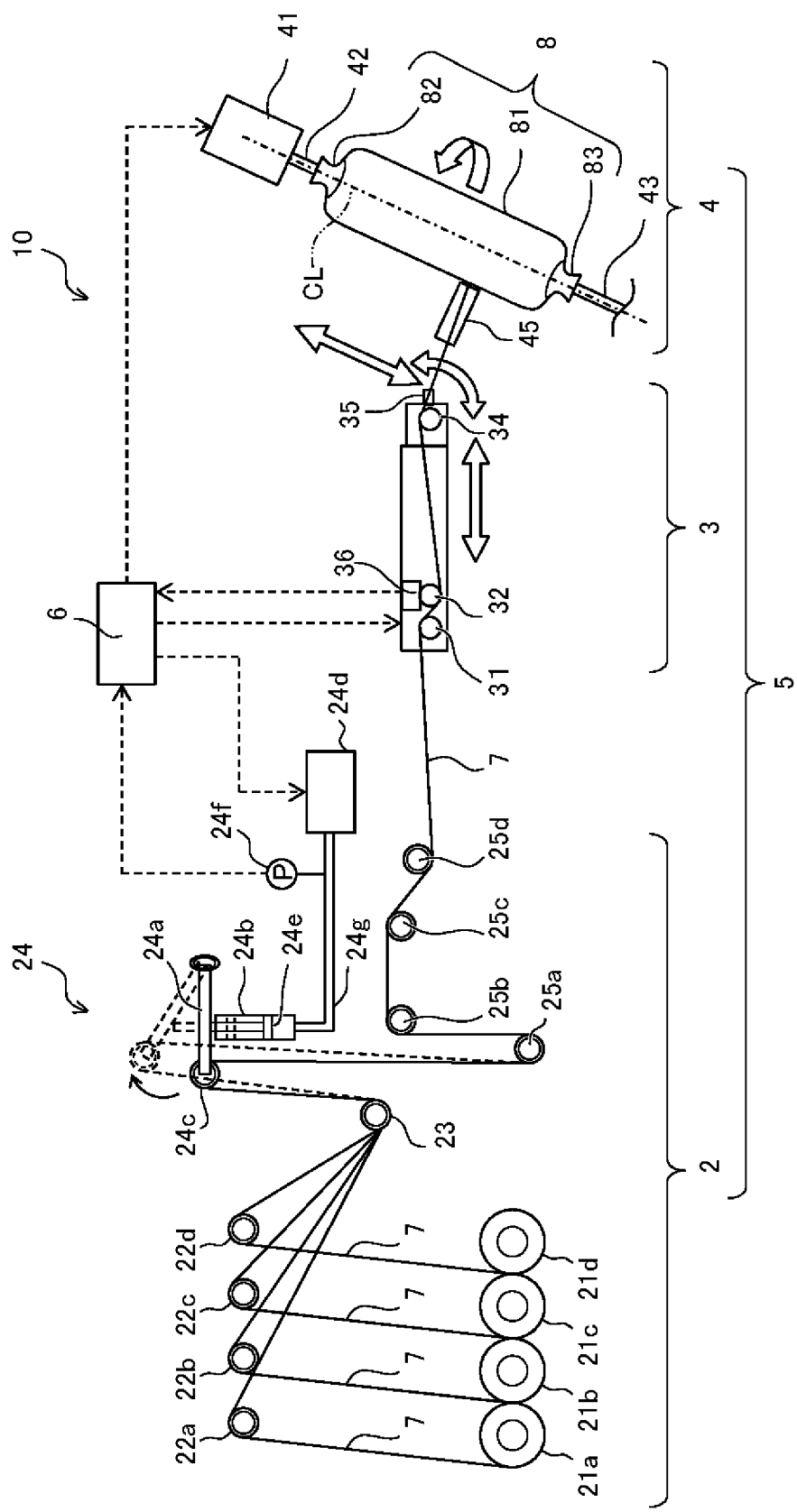
FIG. 1 is a schematic conceptual view of a producing apparatus for use in a method for producing a high-pressure tank according to a first embodiment.

FIG. 1 is a schematic conceptual view of a producing apparatus 10 for use in a method for producing a high-pressure tank 1 according to a first embodiment. The producing apparatus 10 is a filament winding device, in which a fiber bundle 7 impregnated with an uncured thermosetting resin is wound around a liner 8 for housing gas while the liner 8 is being rotated, so that a reinforcing layer 70 with a plurality of fiber-reinforced resin layers 71a, 71b, 71c, . . . stacked is formed on the liner 8.

In the present embodiment, the fiber bundle 7 impregnated with an uncured thermosetting resin includes continuous reinforcing fibers that are impregnated with the uncured thermosetting resin. Examples of the continuous fibers include glass fibers, carbon fibers, alamido fibers, alumina fibers, boron fibers, steel fibers, PBO fibers, natural fibers, and high-strength polyethylene fibers.

Further, examples of the thermosetting resin include an epoxy resin, modified epoxy resin represented by a vinyl ester resin, phenol resin, melamine resin, urea resin, unsaturated polyester resin, alkyd resin, polyurethane resin, and thermosetting polyimide resin.

The producing apparatus 10 includes a fiber unwinding unit 2, fiber delivery unit 3, winding unit 4, and control device 6, which constitute a winding unit 5 that performs winding of the fiber bundle 7 around the tank liner 8 (hereinafter referred to as the "liner 8"). In the present embodiment, the liner 8 includes a body 81 having a space for housing a high-pressure gas such as a hydrogen gas, and first and second caps 82 and 83 attached to its opposite sides.

The fiber unwinding unit 2 includes a plurality of bobbins 21a to 21d, a plurality of conveying rollers 22a to 22d, a bundling roller 23, and a dancer 24, and has a function of unwinding the fiber bundle 7 impregnated with an uncured thermosetting resin. The bobbins 21a to 21d are each cylindrical member with the fiber bundle 7 wound therearound, and are rotationally driven by an electric motor (not shown) to unwind the fiber bundle 7.

The conveying rollers 22a to 22d are provided so as to correspond to the bobbins 21a to 21d, and convey the fiber bundle 7 unwound from the bobbins 21a to 21d to the bundling roller 23. The bundling roller 23 pulls and bundles the fiber bundle 7 unwound from the bobbins 21a to 21d and unwinds the fiber bundle 7 to the dancer 24 as a tension applying unit.

The dancer 24 includes a dancer arm 24a, cylinder 24b, dancer roller 24c, and air pressure adjusting device 24d, and has a function of applying tension to the fiber bundle 7 to be wound around the liner 8. At an end of the dancer arm 24a, the dancer roller 24c is rotationally attached, the dancer roller 24c having the fiber bundle 7 wound therearound so as to be hooked.

The dancer arm 24a vertically swings as shown by the arrow in the drawing to keep the tension applied to the fiber bundle 7 constant. The cylinder 24b includes a piston 24e connected to the dancer arm 24a, and communicates with an air pressure adjusting device 24d via piping 24g to which a pressure sensor 24f is connected.

The air pressure adjusting device 24d is a device for adjusting the pressure of the air to be ejected with the control by the control device 6, which will be described later, for example, a typical device including a compressor, pressure adjusting valve, and the like (not shown). The dancer 24 adjusts the tension of the fiber bundle 7 by swinging the dancer arm 24a with the movement of the piston 24e in accordance with an increase or decrease in the air pressure adjusted by the air pressure adjusting device 24d. The fiber bundle 7 with its tension adjusted is conveyed to the fiber delivery unit 3 via conveying rollers 25a to 25d. It should be noted that the fiber delivery unit 3 corresponds to the "delivery unit" of the present disclosure.

The fiber delivery unit 3 is a unit for delivering the fiber bundle 7 impregnated with the uncured thermosetting resin to the periphery of the liner 8 being rotated while reciprocating from one end to the other end of the liner 8 along the axial direction of the liner 8.

The fiber delivery unit 3 includes first and second guiding rollers 31 and 32 for guiding the fiber bundle 7 and a delivery roller 34 for delivering the fiber bundle 7 to the liner 8, the first and second guiding rollers 31 and 32 and the delivery roller 34 being disposed along the direction of conveying the fiber bundle 7 from the upstream to the downstream. Further, the fiber delivery unit 3 includes a press heating part 35 for heating the fiber bundle 7 while pressing it in the downstream of the conveying direction of the delivery roller 34. The first and second guiding rollers 31 and 32 pull and bundle the fiber bundle 7 passing therethrough, while the delivery roller 34 delivers the fiber bundle 7 to the liner 8. The press heating part 35 will be detailed later.

Figure 2A:
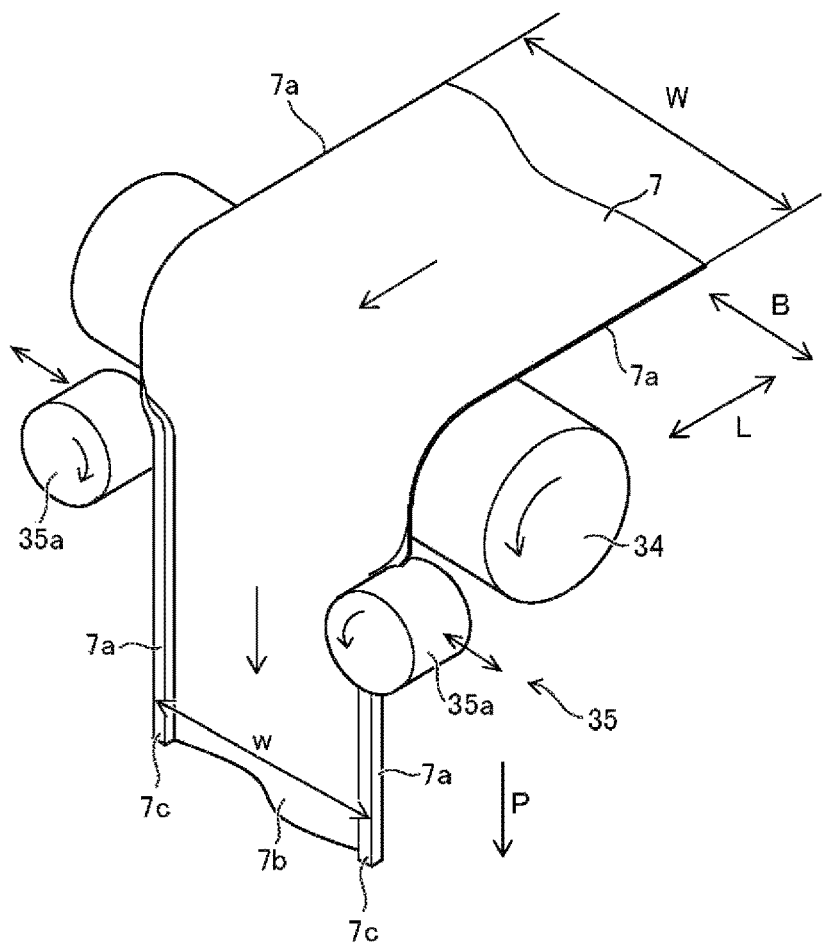
FIG. 2A is a schematic perspective view of a press heating part of the producing apparatus for the high-pressure tank according to the first embodiment illustrated in FIG. 1.

The fiber delivery unit 3 can move toward the liner 8 as shown by the arrows, and oscillate around a conveying direction L (see FIG. 2A). Further, the fiber delivery unit 3 can reciprocate along the central axis CL in the longitudinal direction of the liner 8 from one end to the other end of the liner 8. The aforementioned movement, oscillation, and reciprocation of the fiber delivery unit 3 are achievable through a typically known mechanism, and these operations are controlled by the control device 6.

In the present embodiment, the fiber bundle 7 is brought in from the side of the first guiding roller 31, contacts the upper side periphery of the first guiding roller 31, the lower side periphery of the second guiding roller 32, and the upper side periphery of the delivery roller 34, and is then guided to the liner 8. It should be noted that the second guiding roller 32 is provided with a tension measuring part 36 for measuring the acting force of the fiber bundle 7 wound around the second guiding roller 32 so as to measure the tension of the fiber bundle 7 from the measured acting force.

The winding unit 4 has a function of winding the fiber bundle 7 around the liner 8 by rotating the liner 8 about the central axis CL in the longitudinal direction of the liner 8. The liner 8 is rotatable about the central axis CL in the longitudinal direction. The winding unit 4 includes a motor-driven rotating device 41 for rotating the liner 8, rotating rod 42, supporting rod 43, and touch roller 45. It should be noted that the winding unit 4 corresponds to the "rotating unit" of the present disclosure.

An end of the rotating rod 42 is fixed to the rotating device 41 while the other end is fixed to the first cap 82. The supporting rod 43 supports the liner 8 via the second cap 83. When the rotating device 41 is activated, the rotating rod 42 is rotated to rotate the liner 8 about the central axis CL in the longitudinal direction in one direction, so that the fiber bundle 7 can be wound around the liner 8. In this manner, the continuous fiber bundle 7 is wound around the outer periphery surface of the liner 8 through, for example, hoop winding and helical winding in combination.

It should be noted that with the touch roller 45 provided in a position where the fiber bundle 7 is to be wound around the liner 8, the fiber bundle 7 is wound around the liner 8 while being pressed by the touch roller 45, thereby enabling to stable the state of the wound fiber bundle 7.

The control device 6 controls the operation and suspension of the operation of the winding unit 5 (fiber unwinding unit 2, fiber delivery unit 3, and winding unit 4), and outputs a control signal so as to control the aforementioned operations of the fiber delivery unit 3 and the rotational direction and speed of the rotating device 41.

As described above, the control device 6 controls the air pressure adjusting device 24d on the basis of the measurements obtained by the pressure sensor 24f so as to control the tension of the fiber bundle 7. Specifically, in the present embodiment, the tension of the fiber bundle 7 is measured by the tension measuring part 36 and the air pressure adjusting device 24d (the pressure of the air ejected therefrom) is controlled so that the measured tension of the fiber bundle 7 becomes a predetermined tension.

The press heating part 35 of the fiber delivery unit 3, which is the characteristic point of the present embodiment, will be described below with reference to FIGS. 2A and 2B. The press heating part 35 is disposed in the downstream in the conveying direction of the delivery roller 34 and includes a pair of heating rollers 35a, 35a.

Figure 2B:
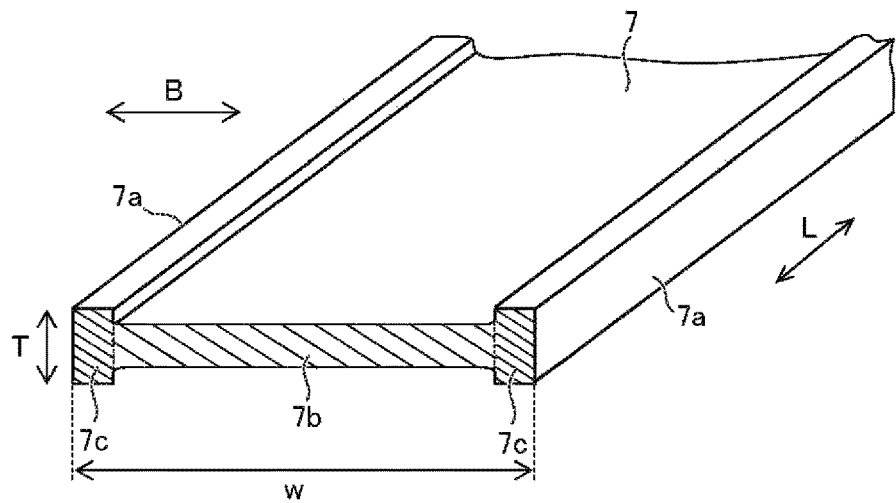
FIG. 2B is a schematic perspective view of a fiber bundle deformed by the press heating part illustrated in FIG. 2A.

The heating rollers 35a, 35a have a function of pressing edge portions 7a, 7a on the opposite sides along the longitudinal direction L of the conveyed fiber bundle 7 in a width direction B of the fiber bundle 7, thereby deforming the edge portions 7a, 7a so as to protrude in a thickness direction T of the fiber bundle 7 (see FIG. 2B). In addition to this function, the heating rollers 35a, 35a have a function of thermally curing, through heating, the thermosetting resin of the deformed edge portions 7a, 7a.

Specifically, the heating rollers 35a, 35a are heated to a temperature at which an uncured thermoplastic resin with which the fiber bundle 7 is impregnated can be cured. For example, when an epoxy resin is used as the thermoplastic resin, the heating rollers 35a, 35a are heated to a temperature of 300° C. to 500° C., which is higher than the temperature at which curing of the epoxy resin begins. Examples of the method for heating the heating rollers 35a, 35a include resistance heating and induction heating. The heating method is not particularly limited, and a heater may be provided inside the heating rollers 35a, 35a or external induction heating may be adopted.

The heating rollers 35a, 35a are each rotational about the rotational axis orthogonal to a direction P in which the fiber bundle 7 is conveyed. The heating rollers 35a, 35a are not connected to a motor or the like, and may be rotated in accordance with the speed of conveying the fiber bundle 7. In the present embodiment, the pair of heating rollers 35a, 35a are spaced apart from each other, with the distance between their periphery surfaces corresponding to a width w of the fiber bundle 7 after pressing and narrower than a width W of the fiber bundle 7 before pressing.

With the aforementioned configuration, the fiber bundle 7 delivered from the delivery roller 34 is conveyed between the pair of heating rollers 35a, 35a. When the fiber bundle 7 passes through between the pair of heating rollers 35a, 35a, the edge portions 7a, 7a on the opposite sides along the longitudinal direction L of the fiber bundle 7 are pressed in the width direction B of the fiber bundle 7. In this manner, the edge portions 7a, 7a of the fiber bundle 7 are deformed so as to protrude in the thickness direction T of the fiber bundle 7, forming the cross-sectional shape of the fiber bundle 7 in its width direction B in an H-shape.

Simultaneously with the deformation being performed, the thermosetting resin in the edge portions 7a, 7a on the opposite sides of the fiber bundle 7 is thermally cured with the heat of the pair of heating rollers 35a, 35a. In this manner, as illustrated in FIG. 2B, in the edge portions 7a, 7a on the opposite sides of the fiber bundle 7, protruding portions 7c with the thermosetting resin thermally cured are formed. The width w of the fiber bundle 7 that has passed through the pair of heating rollers 35a, 35a is narrower than the width W of the fiber bundle 7 before passing through the pair of heating rollers 35a, 35a.

Further, since the heat of the heating rollers 35a, 35a is not sufficiently transmitted to the thermosetting resin with which the fiber bundle 7 is impregnated on the inner side of the edge portions 7a, 7a of the fiber bundle 7, which is a portion between the edge portions 7a, 7a of the fiber bundle 7 in the present embodiment, the thermosetting resin with which the fiber bundle 7 is impregnated in the portion is uncured.

It should be noted that in the present embodiment, the pair of heating rollers 35a, 35a are adjustable so as to have a distance between their periphery surfaces narrower than the width W, thus enabling the protruding portions 7c, 7c to be formed on the edge portions 7a, 7a of the fiber bundle 7, as necessary.

Figure 3A:
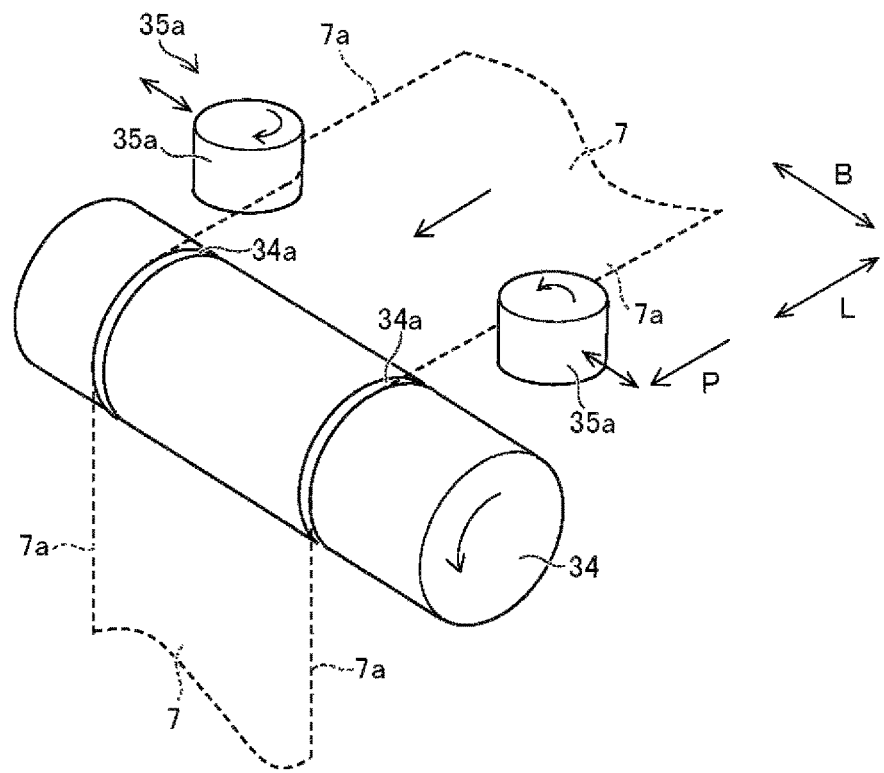
FIG. 3A is a schematic perspective view of the press heating part according to a modification of FIG. 2A.
Figure 3B:
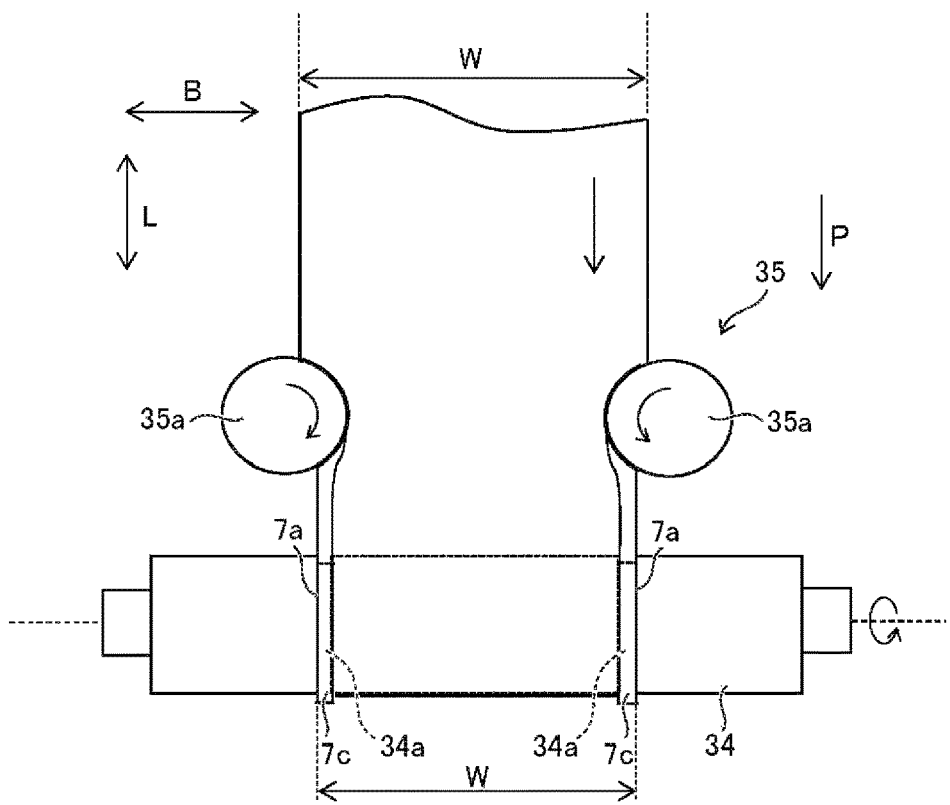
FIG. 3B is a plan view for explaining a fiber bundle passing through the press heating part illustrated in FIG. 3A.

Although in the present embodiment, the press heating part 35 is disposed in the downstream of the delivery roller 34, as in a modification illustrated in FIGS. 3A and 3B, for example, the press heating part 35 may be disposed in the upstream in the conveying direction P of the delivery roller 34. Also in the modification, the press heating part 35 includes a pair of heating rollers 35a, 35a. Similarly in the modification, the pair of heating rollers 35a, 35a are disposed apart from each other with a distance narrower than the width W of the fiber bundle 7, thereby pressing the edge portions 7a, 7a of the fiber bundle 7 that has passed through between the pair of heating rollers 35a, 35a so that the protruding portions 7c, 7c protruding in the thickness direction T of the fiber bundle 7 are formed.

In the present embodiment, the delivery roller 34 has housing grooves 34a, 34a for housing the protruding portions 7c, 7c protruding in the thickness direction T of the fiber bundle 7, formed along its circumferential direction. The fiber bundle 7 is likely to slip from the delivery roller 34 due to the aforementioned movement, oscillation, and reciprocation of the fiber delivery unit 3, but in this modification, the housing grooves 34a, 34a house the protruding portions 7c, 7c, so that the slipping of the delivered fiber bundle 7 from the delivery roller 34 in the width direction B can be reduced.

In this manner, in the present embodiment, in forming the fiber-reinforced resin layers, the fiber bundle 7 with the protruding portions 7c, 7c formed thereon is wound around the liner 8 while the liner 8 is being rotated, thereby enabling to reduce the slipping of the fiber bundle 7, with the anchor effect of the protruding portions 7c, 7c of the edge portions 7a, 7a of the wound fiber bundle 7, so that the positional deviation of the wound fiber bundle 7 can be reduced. It should be noted that in this case, the way of winding the fiber bundle 7 is not particularly limited, but forming of the fiber-reinforced resin layers through hoop winding will be described below as an example.

In the present embodiment, while the liner 8 is being rotated about the central axis CL in the longitudinal direction of the liner 8, the fiber bundle 7 impregnated with the resin is continuously wound around the outer periphery surface of the liner 8, so that the reinforcing layer 70 is formed around the outer periphery surface of the liner 8. The reinforcing layer 70 includes a plurality of fiber-reinforced resin layers 71a, 71b, 71c, . . . stacked. The plurality of fiber-reinforced resin layers 71a, 71b, 71c, . . . may be formed through hoop winding, helical winding, or the like, but in the present embodiment, the fiber-reinforced resin layers 71a, 71b, 71c, . . . are formed through hoop winding.

Figure 4:
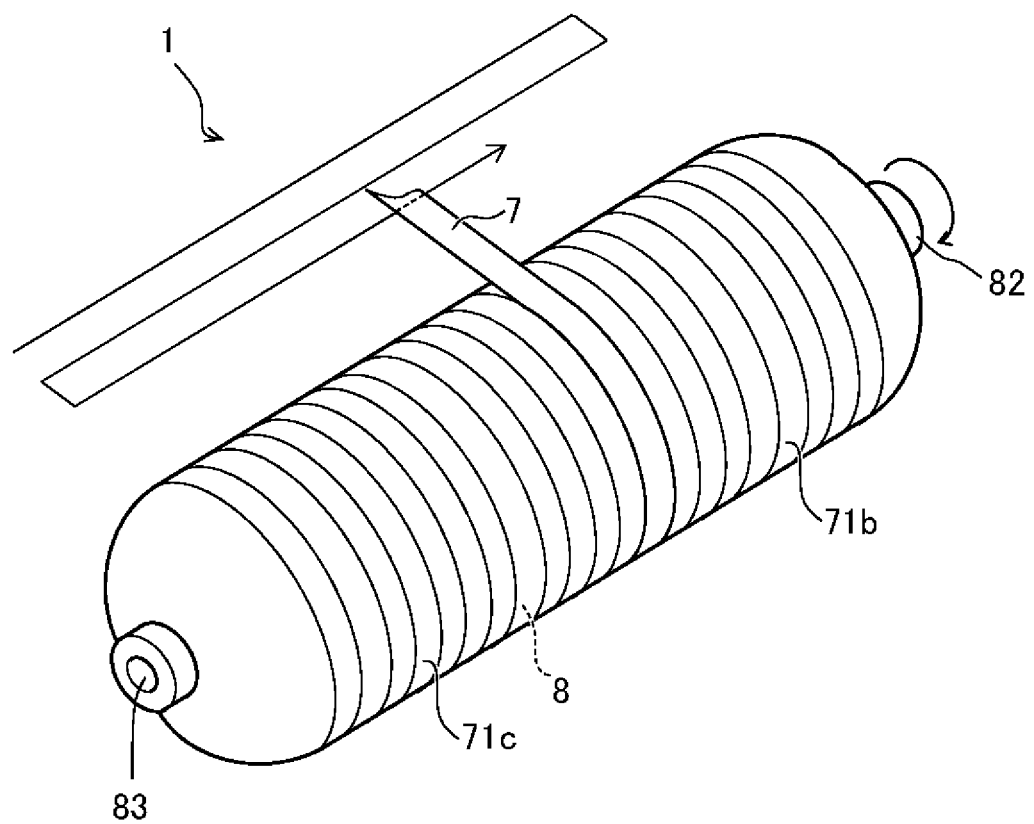
FIG. 4 is a schematic perspective view for explaining a way of winding a fiber bundle in producing the high-pressure tank illustrated in FIG. 1.

The reinforcing layer 70 is formed by stacking the plurality of fiber-reinforced resin layers 71a, 71b, 71c, . . . in this order from the outer periphery surface of the liner 8 through winding of the continuous fiber bundle 7. It should be noted that FIG. 4 is a schematic perspective view of the fiber-reinforced resin layer 71c as an upper layer halfway formed on the fiber-reinforced resin layer 71b as a lower layer that form the reinforcing layer 70, as an example.

Figure 5A:
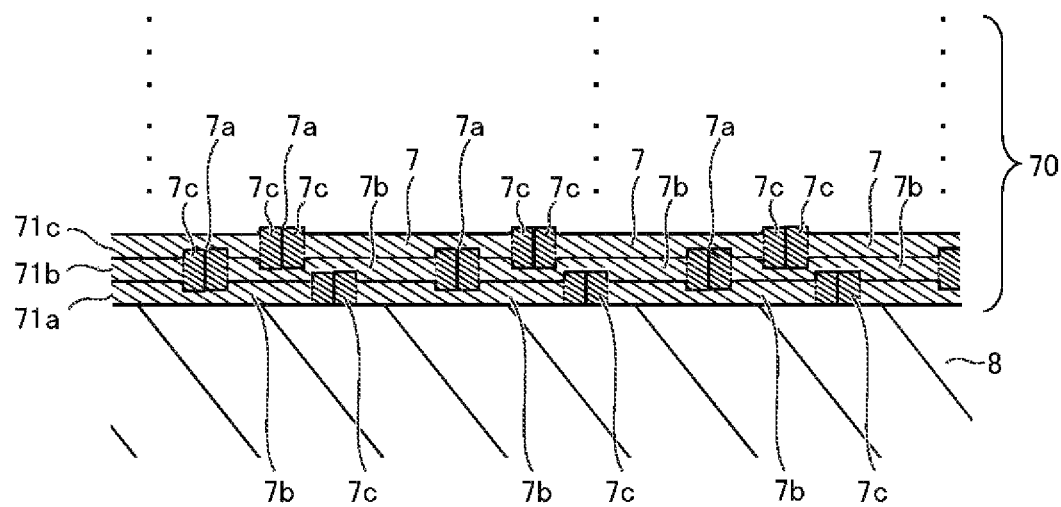
FIG. 5A is a schematic cross-sectional view of a reinforcing layer with a fiber bundle wound around a liner through the way of winding illustrated in FIG. 4.

In the present embodiment, the control device 6 of the producing apparatus 10 controls the reciprocating movement of the fiber delivery unit 3, the speed of conveying the fiber bundle 7, and the rotational speed of the liner 8, so that the position where the fiber bundle 7 is wound around the liner 8 is controlled. Specifically, as illustrated in FIG. 5A, the control device 6 controls the position of the fiber bundle 7 to be wound such that the deformed edge portions 7a, 7a of the fiber bundle 7 are disposed on a portion 7b including the uncured thermosetting resin of the fiber-reinforced resin layer 71a (71b) as a lower layer. In this manner, the fiber-reinforced resin layer 71b (71c) as the upper layer can be further formed on the fiber-reinforced resin layer 71a (71b) as the lower layer.

In the aforementioned manner, in the present embodiment, the deformed edge portions 7a, 7a of the fiber bundle 7 are disposed on the portion 7b including the uncured thermosetting resin of the fiber-reinforced resin layer 71b as the lower layer. Thus, in forming the fiber-reinforced resin layer 71b (71c) as the upper layer, the thermally cured protruding portions 7c, 7c in the edge portions 7a, 7a of the fiber bundle 7 are disposed on the portion 7b including the uncured thermosetting resin of the fiber-reinforced resin layer 71a (71b) as the lower layer, and thus enters the portion. As a result, in forming the plurality of fiber-reinforced resin layers 71a, 71b, 71c, . . . , the positional deviation of the wound fiber bundle 7 of the fiber-reinforced resin layer 71b (71c) as the upper layer can be reduced.

In particular, in the present embodiment, with the protruding portions 7c, 7c formed on the opposite sides of the fiber bundle 7, the anchor effect of the protruding portions 7c, 7c can be further exhibited in winding the fiber bundle 7.

Figure 5B:
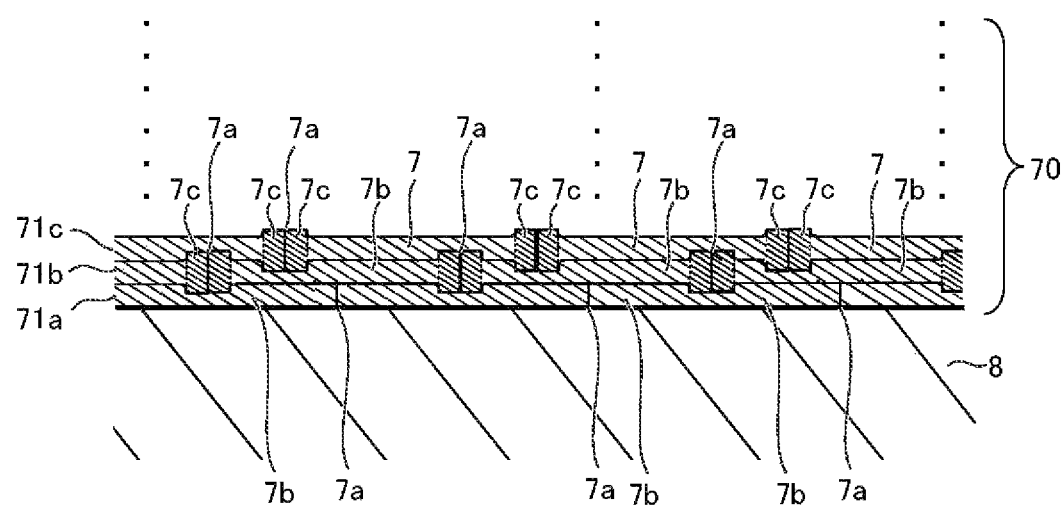
FIG. 5B is a schematic cross-sectional view of the reinforcing layer according to a modification of FIG. 5A.

Herein, in FIG. 5A, the protruding portions 7c, 7c are also formed in the fiber bundle 7 that contacts the liner 8, but as illustrated in FIG. 5B, for example, the fiber-reinforced resin layer 71a may be formed by winding the fiber bundle 7 around the liner 8 without deforming the edge portions 7a, 7a of the fiber bundle 7 that contacts the liner 8. Such forming allows the fiber-reinforced resin layer 71a to follow the surface of the liner 8, thereby reducing the slipping of the fiber bundle 7 of the fiber-reinforced resin layer 71a from the liner 8.

Second Embodiment

Figure 6A:
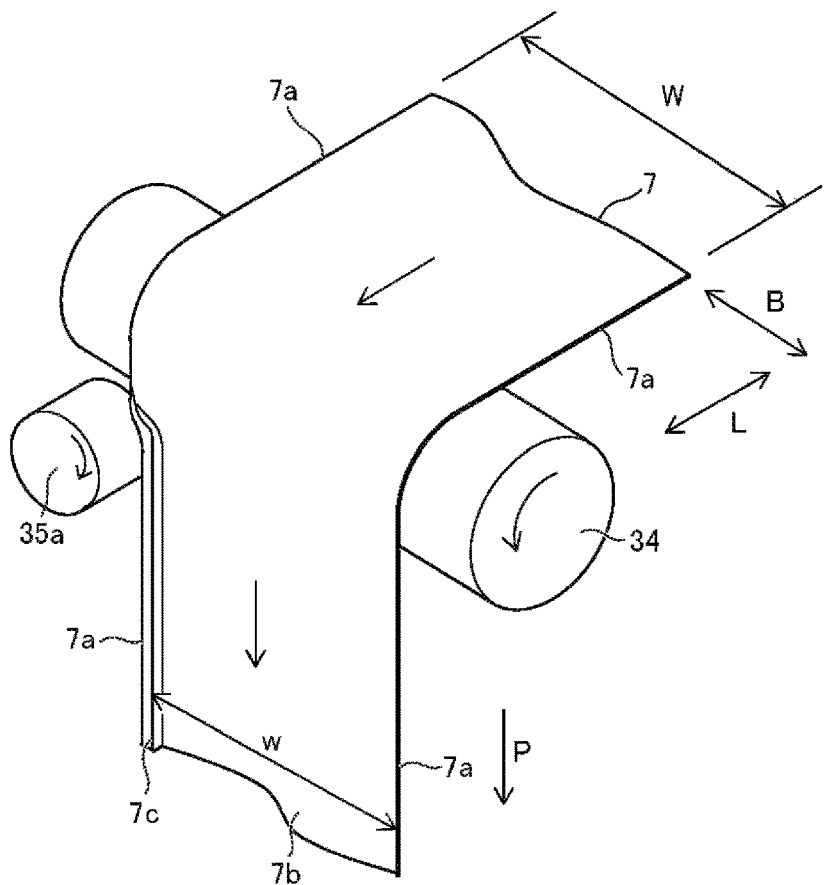
FIG. 6A is a schematic perspective view of a press heating part of a producing apparatus for a high-pressure tank of a second embodiment.

In the first embodiment and its modification, the press heating part 35 is disposed in the downstream or upstream of the conveying direction P of the delivery roller 34, and includes the pair of heating rollers 35a, 35a. In the second embodiment illustrated in FIG. 6A, the press heating part 35 includes only one heating roller 35a. It should be noted that since the other part of the configuration of the producing apparatus is the same as that of the aforementioned embodiment, the detailed explanation will be omitted.

In the present embodiment, similarly to the first embodiment, the heating roller 35a has a function of pressing the edge portion 7a on one side along the longitudinal direction L of the conveyed fiber bundle 7 in the width direction B of the fiber bundle 7, thereby deforming the edge portion 7a so as to protrude in the thickness direction T of the fiber bundle 7. In addition to this function, the heating roller 35a has a function of heating the thermosetting resin of the deformed edge portion 7a.

With the press heating part 35 configured as such, when the fiber bundle 7 delivered from the delivery roller 34 passes through the heating roller 35a, the edge portion 7a on one side along the longitudinal direction L of the fiber bundle 7 is pressed in the width direction B of the fiber bundle 7, so that the edge portion 7a of the fiber bundle 7 is deformed so as to protrude in the thickness direction T of the fiber bundle 7, forming the cross-sectional shape of the fiber bundle 7 in the width direction B in a T-shape.

Figure 6B:
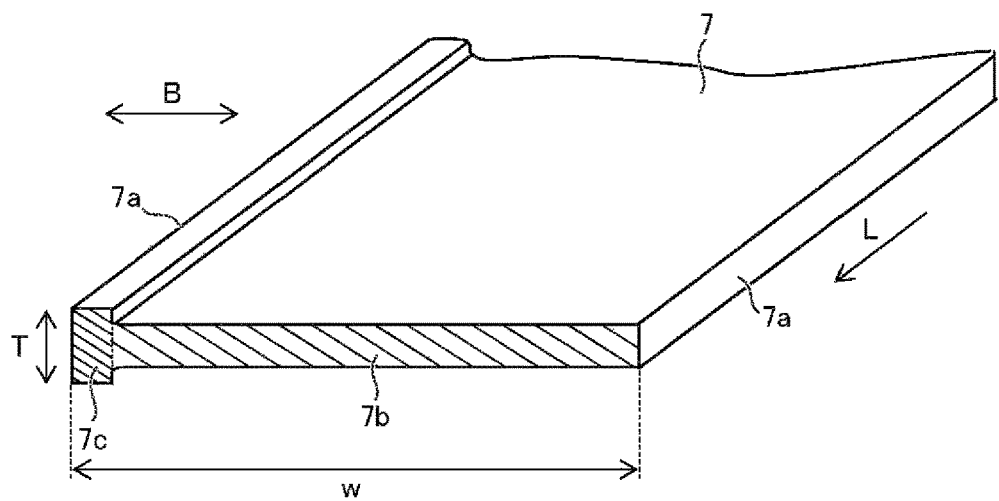
FIG. 6B is a schematic perspective view of a fiber bundle deformed by the press heating part illustrated in FIG. 6A.

Simultaneously with the deformation being performed, the thermosetting resin in the edge portion 7a on one side of the fiber bundle 7 is thermally cured with the heat of the heating roller 35a. In this manner, as illustrated in FIG. 6B, in the edge portion 7a on one side of the fiber bundle 7, the protruding portion 7c with the thermosetting resin thermally cured is formed.

Figure 7A:
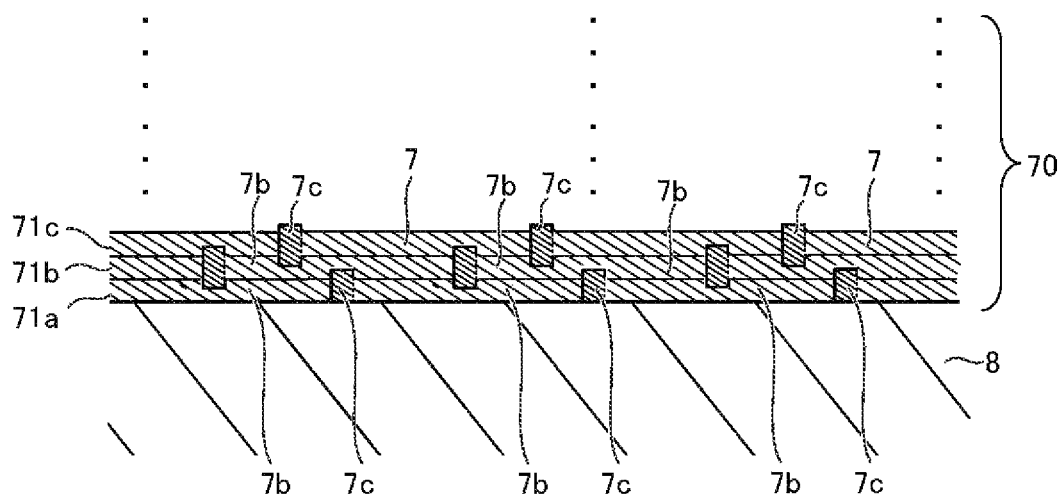
FIG. 7A is a schematic cross-sectional view of a reinforcing layer with a fiber bundle wound around a liner through the way of winding illustrated in FIG. 4.

The fiber bundle 7 with the protruding portion 7c formed as such is wound around the liner 8 similarly to the first embodiment. Specifically, also in the present embodiment, with the control by the control device 6, as illustrated in FIG. 7A, the fiber bundle 7 is wound along the circumferential direction of the liner 8 such that the deformed edge portion 7a of the fiber bundle 7 is disposed on the portion 7b including the uncured thermosetting resin of the fiber-reinforced resin layer 71a (71b) as the lower layer. In this manner, the fiber-reinforced resin layer 71b (71c) as the upper layer is further formed on the fiber-reinforced resin layer 71a (71b) as the lower layer.

In this manner, similarly to the first embodiment, in forming the fiber-reinforced resin layer 71b (71c) as the upper layer, the thermally cured protruding portion 7c in the edge portion 7a of the fiber bundle 7 is disposed on the portion 7b including the uncured thermosetting resin of the fiber-reinforced resin layer 71a (71b) as the lower layer, and thus enters the portion. Thus, the positional deviation of the wound fiber bundle 7 of the fiber-reinforced resin layer 71b (71c) as the upper layer can be reduced in forming the plurality of fiber-reinforced resin layers 71a, 71b, 71c, . . . .

Further, the fiber bundle 7 with the protruding portion 7c formed as such is wound around the liner 8 similarly to the first embodiment. Specifically, also in the present embodiment, with the control by the control device 6, as illustrated in FIG. 7A, the fiber bundle 7 is wound along the circumferential direction of the liner 8 such that the deformed edge portion 7a of the fiber bundle 7 is disposed on the portion 7b including the uncured thermosetting resin of the fiber-reinforced resin layer 71a (71b) as the lower layer. In this manner, the fiber-reinforced resin layer 71b (71c) as the upper layer is further formed on the fiber-reinforced resin layer 71a (71b) as the lower layer.

It should be noted that in the first and second embodiments, the fiber bundle is wound such that the deformed edge portion is adjacent to the edge portion of the fiber bundle wound around the liner. However, as illustrated in FIG. 7B, the producing apparatus 10 may form the fiber-reinforced resin layer 71a (71b, 71c . . . ) by winding the fiber bundle 7 such that the deformed edge portion 7a on one side overlaps, along the circumferential direction of the liner, a portion including the uncured thermosetting resin on the inner side of the edge portion 7a of the fiber bundle 7 wound around the liner 8.

With such forming, the protruding portion 7c (edge portion 7a of the fiber bundle 7) with its thermosetting resin cured overlaps and enters the portion 7b including the uncured thermosetting resin on the inner side of the edge portion 7a of the fiber bundle 7 wound around the liner 8, so that the positional deviation of the wound fiber bundle can be reduced in forming each of the fiber-reinforced resin layers 71a, 71b, 71c . . . .

The embodiments of the present disclosure are described in detail above, but the present disclosure is not limited to the aforementioned embodiments, and various design changes may be made within the scope of the spirit of the present disclosure described in the claims.

Figure 7B:
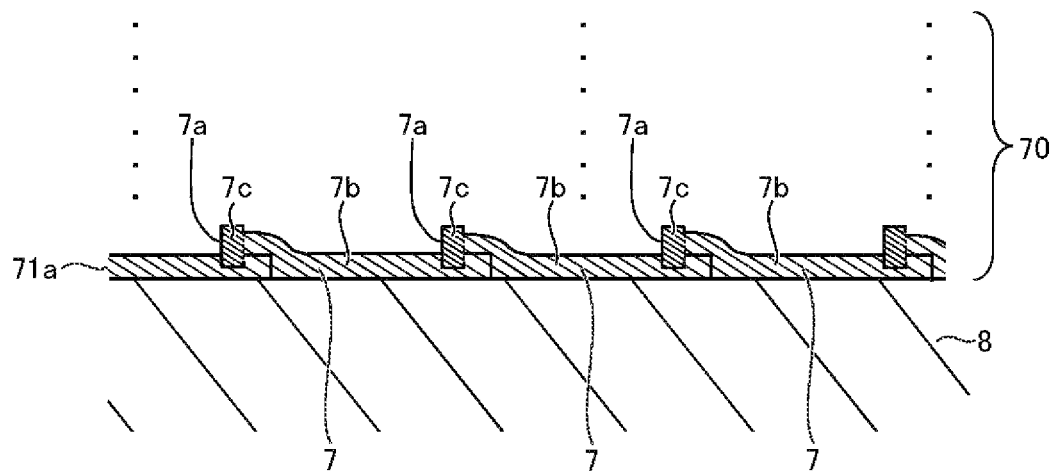
FIG. 7B is a schematic cross-sectional view of the reinforcing layer according to a modification of FIG. 7A.

In the second embodiment, as illustrated in FIG. 7B, the fiber-reinforced resin layers are formed by winding the fiber bundle with the protruding portion formed in the edge portion on one side, but the fiber-reinforced resin layers may also be formed by winding the fiber bundle with the protruding portions formed in the edge portions on the opposite sides as shown in the first embodiment.

Further, in the first and second embodiments, the press heating part is provided with the heating roller, but, for example, as long as the protruding portion can be formed in the edge portion of the fiber bundle, a heated bar, guide, or the like may be used in place of the heating roller.

What is claimed is:

1. A method for producing a high-pressure tank, in which a fiber bundle impregnated with an uncured thermosetting resin is wound around a liner for housing gas while the liner is being rotated so as to form, on the liner, a reinforcing layer with a plurality of fiber-reinforced resin layers stacked, the method comprising:
   pressing an edge portion on at least one side along a longitudinal direction of the fiber bundle in a width direction of the fiber bundle to deform the edge portion so as to protrude in a thickness direction of the fiber bundle and thermally curing the thermosetting resin in the edge portion deformed so as to form a protruding portion in the edge portion; and
   forming the fiber-reinforced resin layers with the fiber bundle having the protruding portion formed thereon.

2. The method for producing a high-pressure tank according to claim 1, wherein the protruding portion is formed on each of opposite sides of the fiber bundle.

3. The method for producing a high-pressure tank according to claim 1, wherein in forming the fiber-reinforced resin layers, the fiber-reinforced resin layer as an upper layer is further formed on the fiber-reinforced resin layer as a lower layer by winding the fiber bundle along a circumferential direction of the liner such that the protruding portion is disposed on a portion including the uncured thermosetting resin of the fiber-reinforced resin layer as the lower layer.

4. The method for producing a high-pressure tank according to claim 1, wherein in forming the fiber-reinforced resin layers, each fiber-reinforced resin layer is formed by winding the fiber bundle such that the protruding portion sequentially overlaps, along a circumferential direction of the liner, a portion including the uncured thermosetting resin on an inner side of the edge portion of the fiber bundle wound around the liner.

5. A producing apparatus for a high-pressure tank, in which a fiber bundle impregnated with an uncured thermosetting resin is wound around a liner for housing gas so as to form, on the liner, a reinforcing layer with a plurality of fiber-reinforced resin layers stacked, the producing apparatus comprising:
   a rotating unit adapted to rotate the liner about an axial direction of the liner; and
   a delivery unit adapted to deliver the fiber bundle impregnated with the uncured thermosetting resin to a periphery of the liner being rotated while reciprocating from one end to another end of the liner along the axial direction, the delivery unit including a press heating part adapted to press an edge portion on at least one side along a longitudinal direction of the fiber bundle in a width direction of the fiber bundle to deform the edge portion so as to protrude in a thickness direction of the fiber bundle and to thermally cure, through heating, the thermosetting resin in the edge portion deformed.

6. The producing apparatus for a high-pressure tank according to claim 5, wherein the press heating part presses the edge portion on each of opposite sides along the longitudinal direction of the fiber bundle in the width direction of the fiber bundle to deform the edge portion so as to protrude in the thickness direction of the fiber bundle and thermally cures, through heating, the thermosetting resin in the edge portion deformed.

7. The producing apparatus for a high-pressure tank according to claim 5, comprising a control device adapted to control a position where the fiber bundle delivered from the delivery unit is wound,
   wherein the control device controls the position where the fiber bundle is wound such that the edge portion deformed of the fiber bundle is disposed on a portion including the uncured thermosetting resin of the fiber-reinforced resin layer as a lower layer.

8. The producing apparatus for a high-pressure tank according to claim 5, comprising a control device adapted to control a position where the fiber bundle delivered from the delivery unit is wound,
wherein the control device controls the position where the fiber bundle is wound such that the edge portion deformed by the press heating part overlaps, along a circumferential direction of the liner, a portion including the uncured thermosetting resin on an inner side of the edge portion of the fiber bundle wound around the liner.

\* \* \* \* \*